United States Patent
Bethouart

(10) Patent No.: US 12,071,552 B2
(45) Date of Patent: Aug. 27, 2024

(54) ALCOHOL-BASED DRY ERASABLE INK FOR WRITING INSTRUMENT

(71) Applicant: Société BIC, Clichy (FR)

(72) Inventor: Carine Bethouart, Neufchatel-Hardelot (FR)

(73) Assignee: SOCIÉTÉ BIC, Clichy (FR)

( * ) Notice: Subject to any disclaimer, the term of this patent is extended or adjusted under 35 U.S.C. 154(b) by 825 days.

(21) Appl. No.: 17/280,002

(22) PCT Filed: Sep. 23, 2019

(86) PCT No.: PCT/EP2019/075563
§ 371 (c)(1),
(2) Date: Mar. 25, 2021

(87) PCT Pub. No.: WO2020/064652
PCT Pub. Date: Apr. 2, 2020

(65) Prior Publication Data
US 2021/0395542 A1    Dec. 23, 2021

(30) Foreign Application Priority Data
Sep. 26, 2018 (EP) .................................. 18306251

(51) Int. Cl.
*C09D 11/00* (2014.01)
*C09D 11/17* (2014.01)

(52) U.S. Cl.
CPC .................... *C09D 11/17* (2013.01)

(58) Field of Classification Search
CPC ................. C09D 11/17; C09D 11/00
USPC ................. 106/31.01, 31.13, 31.32
See application file for complete search history.

(56) References Cited

U.S. PATENT DOCUMENTS

| | | | |
|---|---|---|---|
| 4,256,494 A * | 3/1981 | Yamamoto | C09D 11/16 106/31.62 |
| 4,578,117 A | 3/1986 | Nakanishi | |
| 5,316,574 A | 5/1994 | Fujita et al. | |
| 2020/0048484 A1 | 2/2020 | Bethouart et al. | |

FOREIGN PATENT DOCUMENTS

| | | | | |
|---|---|---|---|---|
| CN | 1100118 A | * | 3/1995 | |
| CN | 1308402 C | * | 4/2007 | ......... B05D 1/00 |
| CN | 101195722 | | 6/2008 | |
| CN | 101659812 | | 3/2010 | |
| EP | 0551913 | | 7/1993 | |
| JP | 4-28777 | | 1/1992 | |
| WO | 2018-193197 | | 10/2018 | |

OTHER PUBLICATIONS

International Search Report dated Nov. 27, 2019 in corresponding PCT International Patent Application No. PCT/EP2019/075563, 5 pgs.
Written Opinion dated Nov. 27, 2019 in corresponding PCT International Patent Application No. PCT/EP2019/075563, 6 pgs.

* cited by examiner

*Primary Examiner* — James E McDonough
(74) *Attorney, Agent, or Firm* — Ruggiero McAllister & McMahon LLC

(57) ABSTRACT

There is an alcohol-based dry erasable ink for writing instrument having as separating agent, more specifically as the only separating agent, a mixture of a pentaerythritol tetraester (a1), a fatty acid monoester (a2) and a fatty acid diester (a3). There also is a writing instrument having an alcohol-based dry erasable ink.

20 Claims, No Drawings

ALCOHOL-BASED DRY ERASABLE INK FOR WRITING INSTRUMENT

CROSS REFERENCE TO RELATED APPLICATIONS

This application claims priority from PCT Application No. PCT/EP2019/075563, filed on Sep. 23, 2019, now published as WO2020/064652, which claims priority from European Patent Application No. 18306251.2, filed on Sep. 26, 2018, the entire contents of both of which are incorporated herein by reference.

FIELD OF THE DISCLOSURE

The present disclosure relates to alcohol-based dry erasable inks for writing instruments.

DESCRIPTION OF THE RELATED ART

Dry erasable inks (or dry wipe inks) are intended to be used on impervious surfaces such as whiteboard for example of the Velleda® type. In the majority of the cases, they are pigmented inks with low viscosity (between 5 and 10 cP at 20° C.) in particular intended to be used in markers having fibrous tips. They dry quickly and are easily erasable by simple wiping after drying, for example with the help of a dry cloth or a brush.

One of the key properties of this type of ink is their erasability over time. The user wants to be able to erase a whiteboard even after several days, weeks or months.

This erasability property can differ depending on the surface material of the whiteboard: polypropylene, PVC, lacquered, enamel or melamine for example. The dry-erasability of the ink is obtained by the use of separating agents. Indeed, when the ink composition is applied on the impervious writing surface followed by the evaporation of the solvent therefrom to form a writing or marking on the surface, the separating agent forms a thin liquid or semisolid film on the surface while most of the colorant and the resin remain on the film. Therefore, the writing or marking is readily removed or erased from the surface by wiping or light mechanical abrasion with an eraser, or with cloth or paper, or the like.

Several separating agents are already known in the art, such as higher fatty acid esters, phthalic acid diesters, glycols, glycerin, aliphatic higher alcohols, liquid paraffin and the like. However, the erasability of the ink containing one of these separating agents differs depending on the type of surface material of the whiteboard and of the time of erasing (still wet or dry at T0 or over time).

SUMMARY OF THE DISCLOSURE

The inventors have surprisingly found that the use of a particular mixture of 3 types of separating agents allows to obtain a dry erasable ink having the best compromise on the ink erasability property at T0 (humid and dry) and overtime. As shown in the examples, there is therefore a synergy of the use of these 3 separating agents combined together when compared to the separate use of each separating agents or to the use of only two separating agents.

DETAILED DESCRIPTION OF THE DISCLOSURE

Therefore the present disclosure concerns an alcohol-based dry erasable ink for writing instrument comprising as separating agent, more specifically as the only separating agent, a mixture of a pentaerythritol tetraester (a1), a fatty acid monoester (a2) and a fatty acid diester (a3). More specifically the fatty acid monoester (a2) is not sorbitan stearate.

In the sense of the present disclosure, the term "dry erasable ink" or "dry wipe ink" is intended to mean an ink which can be dry erased on the support, even after drying, by simple wiping without the use of water or other solvent, for example by using a dry cloth.

The dry erasable ink according to the present disclosure therefore comprises as the separating agent, more specifically as the only separating agent, a mixture of a pentaerythritol tetraester (a1), a fatty acid monoester (a2) and a fatty acid diester (a3).

The pentaerythritol tetraester (a1) according to the disclosure can be a pentaerythritol ester of tetra fatty acid, in particular of a tetra $C_4$-$C_{20}$ fatty acid. More specifically it is an ester of the following formula (I):

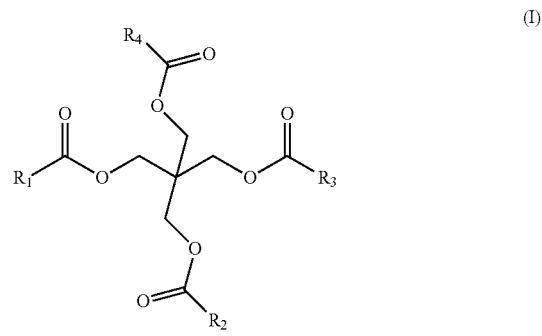

in which $R_1$, $R_2$, $R_3$ and $R_4$ represent independently of each other a $C_4$-$C_{20}$ alkyl group, more specifically a $C_6$-$C_{12}$ alkyl group, even more specifically a $C_8$-$C_{10}$ alkyl group.

In the sense of the present disclosure, the term "$C_4$-$C_{20}$ alkyl group" is intended to mean any linear or branched alkyl group comprising between 4 and 20 carbon atoms. It can be for example a butyl, pentyl, hexyl, heptyl, ethylhexyl, octyl, decyl, nonyl, undecyl, dodecyl, cetyl, stearyl, tridecyl, tetradecyl, pentadecyl, heptadecyl or nonadecyl group.

Examples of pentaerythritol tetraesters according to the present disclosure are pentaerythrityl tetraethylhexanoate, pentaerythrityl tetracaprylate/tetracaprate, pentaerythrityl tetracaprylate, pentaerythrityl tetracaprate and mixture thereof. More specifically it is the pentaerythrityl tetraethylhexanoate.

These esters are commercially available from the company STEARINERIE DUBOIS.

More specifically, the pentaerythritol tetraester (a1) content of the ink according to the present disclosure is in the range 0.1-25% by weight, more specifically in the range 0.5-20% by weight, in particular in the range 1-5% by weight, more particularly in the range 2-4% by weight, based on the total weight of the ink.

In the sense of the present disclosure, the wording "the pentaerythritol tetraester (a1) content" corresponds to "the total pentaerythritol tetraester (a1) content". This applies as well to the other compounds of the present disclosure.

The fatty acid monoester (a2) according to the disclosure is more specifically a fatty acid monoester of alkyl, the alkyl having more specifically from 8 to 22 carbon atoms.

The fatty acid monoester (a2) according to the disclosure can more specifically be a fatty acid monoester having the following formula (II):

$$R_5COOR_6 \qquad (II)$$

in which $R_5$ represents a $C_1$-$C_{20}$ alkyl group, more specifically a $C_4$-$C_{20}$ alkyl group, more specifically a $C_6$-$C_{12}$ alkyl group, even more specifically a $C_8$-$C_{10}$ alkyl group, and $R_6$ represents a $C_8$-$C_{22}$ alkyl group, more specifically a $C_{10}$-$C_{20}$ alkyl group, is more specifically a $C_{12}$-$C_{18}$ alkyl group, even more specifically a $C_{14}$-$C_{16}$ alkyl group.

Examples of fatty acid monoesters according to the present disclosure are $C_8$-$C_{22}$ alkyl ethylhexanoate such as $C_{12}$-$C_{13}$ alkyl ethylhexanoate, $C_{12}$-$C_{15}$ alkyl ethylhexanoate, isocetyl ethylhexanoate, ethylhexyl ethylhexanoate lauryl ethylhexanoate, myristyl ethylhexanoate, cetearyl ethylhexanoate, stearyl ethylhexanoate and tridecyl ethylhexanoate, cetyl octanoate, stearyl octanoate, decyl oleate and hexyl laurate. More specifically it is the cetearyl ethylhexanoate. According to an advantageous embodiment, the dry erasable ink composition according to the disclosure comprises a mixture of at least two fatty acid monoesters (a2).

These esters are commercially available from the company BIOSYNTHIS.

More specifically, the fatty acid monoester (a2) content of the ink according to the present disclosure is in the range 0.1-10% by weight, more specifically in the range 0.2-8% by weight, in particular in the range 0.5-4% by weight, more particularly in the range 1-3% by weight, based on the total weight of the ink.

More specifically, the fatty acid monoester (a2) content of the ink according to the present disclosure is in the range 0.5-10% by weight, based on the total weight of the ink.

The fatty acid diester (a3) according to the disclosure can be a fatty acid diester having the following formula (III):

$$R_7OCO(CH_2)_nCOOR_8 \qquad (III)$$

in which $R_7$ and $R_8$ represent independently of each other a $C_1$-$C_{20}$ alkyl group, more specifically a $C_4$-$C_{20}$ alkyl group, more specifically a $C_6$-$C_{12}$ alkyl group, even more specifically a $C_8$-$C_{10}$ alkyl group, and n is an integer in the range 2-10, more specifically 3-8, even more specifically 4-6, in particular 4.

In an advantageous manner $R_7=R_8$.

Examples of fatty acid diesters according to the present disclosure are diethylhexyl succinate, dibutyl adipate, diisopropyl adipate, dioctyl adipate, didecyl adipate, diethylhexyl adipate, dibutyl sebacate, diisopropyl sebacate, dioctyl sebacate, diethylhexyl sebacate, diethyl pimelate and diethylhexyl pimelate. More specifically it is the diethylhexyl adipate.

These esters are commercially available from the company BIOSYNTHIS.

More specifically, the fatty acid diester (a3) content of the ink according to the present disclosure is in the range 0.1-10% by weight, more specifically in the range 0.2-8% by weight, in particular in the range 0.5-4% by weight, more particularly in the range 1-4% by weight, based on the total weight of the ink.

In an advantageous embodiment, the separating agent, in particular the only separating agent, of the dry erasable ink composition according to the present disclosure is a mixture of pentaerythrityl tetraethylhexanoate, cetearyl ethylhexanoate and diethylhexyl adipate.

In a particular embodiment, the ink according to the present disclosure does not contain:

a fatty acid ester of trimethylolalkane such as C8/C10 trimethylolpropane (for example C8/C10 TMP available commercially under the tradename BALMALUB L397® from the LUMAR company) as mentioned in U.S. Pat. No. 4,578,117 and/or a phosphoric acid ester of a polyoxyethylene alkylene alkyl phenyl ether as mentioned in JPH0428777 and/or a polyoxyethylene polyoxypropylene monoalkyl ether as mentioned in U.S. Pat. No. 5,316,574 and/or a polyoxyethylene polyoxypropylene block copolymer such as the copolymer of formula $HO(CH(CH_3)CH_2O)_x$—$(CH_2CH_2O)_y$—$(CH(CH_3)CH_2O)_xH$ having an average molecular weight of 700-3000 g/mol, in particular of 1950-2650 g/mol, more specifically of approximatively 2650 g/mol (for example available commercially under the tradename Pluronic RPE 1740® from the BASF company) as mentioned in EP0551913.

Indeed, contrary to these patent applications, the presence of one or several of these further separating agents in the ink according to the present disclosure is is not necessary in order to obtain a good erasing property.

In a particular embodiment, the ink according to the present disclosure contains a mixture of a pentaerythritol tetraester (a1), a fatty acid monoester (a2) and a fatty acid diester (a3) as the only separating agents.

The ink according to the present disclosure is an alcohol-based ink. It therefore comprises as the main solvent (i.e. as the solvent having the higher content) an alcohol.

More specifically the alcohol is an alcohol having the following formula (IV):

$$R_9—OH \qquad (IV)$$

in which $R_9$ represents a $C_1$-$C_6$ alkyl group, in particular a $C_1$-$C_4$ alkyl group. More specifically the alcohol is selected in the group consisting of ethanol, propanol (such as isopropanol and/or n-propanol), butanol (such as isobutanol, n-butanol, sec-butanol and/or tert-butanol) and mixture thereof, even more specifically the alcohol is selected in the group consisting of ethanol, propanol and mixture thereof, in particular the alcohol is selected in the group consisting of ethanol, n-propanol and mixture thereof.

More specifically the alcohol content of the ink according to the present disclosure is in the range 40-95% by weight, even more specifically in the range 75-90% by weight, based on the total weight of the ink.

The ink according to the present disclosure can comprise another solvent such as an organic solvent which will evaporate quickly and therefore has a low boiling point. More specifically it does not contain any other solvent.

More specifically, the alcohol-based dry erasable ink according to the disclosure further comprises a pigment, a resin and optionally additives.

The pigment brings the color to the ink and is chosen among the pigments well known by the one skilled in the art, such as for example Pigment Blue 15:6 and Ie Pigment Violet 37 which can be used to provide a blue color to the ink.

More specifically the pigment content of the ink according to the present is disclosure is in the range 0.1-10% by weight, more specifically in the range 0.5-8% by weight, even more specifically in the range 1-5% by weight, based on the total weight of the ink.

The resin contained in the ink according to the present disclosure brings the suitable viscosity for writing, in particular with a marker pen, and adhesiveness onto the impervious writing surface when being applied thereunto.

The resin also will create a film with the pigment after evaporation of the solvent such as the alcohol.

The resin is more specifically alcohol-soluble. The resin can be a vinyl resin, an acrylic resin, a styrene-acrylic resin, a styrene-maleic acid copolymer resin, a rosin-maleic acid copolymer resin, a phenol resin, a cellulose resin, a ketone resin or a mixture thereof. More specifically the resin is a vinyl resin such as a vinyl chloride copolymer, polyvinyl butyral, polyvinyl pyrrolidone, polyvinyl acetate, a vinyl-pyrrolidone copolymer and vinyl acetate or a mixture thereof.

More specifically the resin content of the ink according to the present disclosure is in the range 0.1-10% by weight, even more specifically in the range 0.2-2% by weight, based on the total weight of the ink.

The dry erasable ink according to the present disclosure can also comprise additives in particular selected in the group consisting of surfactants (for example of the anionic, cationic or non-ionic type such as laureth-3, phosphated ethoxylated alcohol, alkyl polyglycol ether phosphate acid or mixture thereof), manufacturing additives (for example of the ester type such as triglycerides, in particular C7, C8 and/or C10 triglycerides), denaturing agents, cap-off additives (for example of the ester or paraffin type such as sorbitan stearate) and mixture thereof.

More specifically if the ink according to the present disclosure contains an additive, its content is in the range 0.1-10% by weight, more specifically in the range 0.5-5% by weight, based on the total weight of the ink.

The dry erasable ink according to the present disclosure is therefore intended to is be used in a writing instrument, such as a pen or a marker pen, more specifically a marker pen, in particular having a fibrous tip.

The marker pen can have a bullet tip or a beveled tip.

The dry erasable ink according to the present disclosure is intended to be used on a non-porous surface, in particular a smooth surface, more particularly an impervious surface, such as a whiteboard. The whiteboard can have different surface material. It can be an enamel board, a lacquered board, a board whose writing surface is covered by a polypropylene film, a board whose writing surface is covered by a PVC film or a melamine board.

The present disclosure also concerns a writing instrument containing the dry erasable ink according to the present disclosure.

More specifically, the writing instrument is a pen or a marker pen, in particular a marker pen, more particularly having a fibrous tip.

The marker pen can have a bullet tip or a beveled tip.

The present disclosure will be better understood when reading the following example.

EXAMPLE

Example 1

Short-term (wet or dry) and long-term erasing properties are tested for several compositions of dry erasable ink:
one ink composition according to the present disclosure comprising as the only separating agent a mixture of pentaerythrityl tetraethylhexanoate (3% by weight), cetearyl ethylhexanoate (2% by weight) and diethylhexyl adipate (2% by weight) which correspond to a total amount of 7% by weight of separating agent (example 1),
one ink composition having the same composition but comprising as the only separating agent pentaerythrityl tetraethylhexanoate (7% by weight), which correspond to a total amount of 7% by weight of separating agent (comparative example 1),
one ink composition having the same composition but comprising as the only separating agent diethylhexyl adipate (7% by weight), which correspond to a total amount of 7% by weight of separating agent (comparative example 2),
one ink composition having the same composition but comprising as the only separating agent cetearyl ethylhexanoate (7% by weight), which correspond to a total amount of 7% by weight of separating agent (comparative example 3),
one ink composition having the same composition but comprising as the only separating agent pentaerythrityl tetraethylhexanoate (3% by weight), which correspond to a total amount of 3% by weight of separating agent (comparative example 4),
one ink composition having the same composition but comprising as the only separating agent diethylhexyl adipate (2% by weight), which correspond to a total amount of 2% by weight of separating agent (comparative example 5),
one ink composition having the same composition but comprising as the only separating agent cetearyl ethylhexanoate (2% by weight), which correspond to a total amount of 2% by weight of separating agent (comparative example 6),
one ink composition having the same composition but comprising as the only separating agent a mixture of pentaerythrityl tetraethylhexanoate (3% by weight) and diethylhexyl adipate (2% by weight), which correspond to a total amount of 5% by weight of separating agent (comparative example 7),
one ink composition having the same composition but comprising as the only separating agent a mixture of pentaerythrityl tetraethylhexanoate (3% by weight) and cetearyl ethylhexanoate (2% by weight), which correspond to a total amount of 5% by weight of separating agent (comparative example 8),
one ink composition having the same composition but comprising as the only separating agent a mixture of pentaerythrityl tetraethylhexanoate (3% by weight) and diethylhexyl adipate (4% by weight), which correspond to a total amount of 7% by weight of separating agent (comparative example 9),
one ink composition having the same composition but comprising as the only separating agent a mixture of pentaerythrityl tetraethylhexanoate (3% by weight) and cetearyl ethylhexanoate (4% by weight), which correspond to a total amount of 7% by weight of separating agent (comparative example 10),
one ink composition similar to the one described in U.S. Pat. No. 4,578,117 comprising as the separating agents a mixture of C8/C10 trimethylolpropane available under the tradename BALMALUB L397® from the LUMAR company (3% by weight), of cetearyl ethylhexanoate (2% by weight) and of diethylhexyl adipate (2% by weight), which correspond to a total amount of 7% by weight of separating agent (comparative example 11),
one ink composition similar to the one described in example 14 of EPP551913 comprising as the separating agents a mixture of a polyoxyethylene polyoxypropylene block copolymer available under the tradename Pluronic RPE 1740® from the BASF company (8% by weight) and pentaerythrityl tetraethylhexanoate (6% by weight), which correspond to a total amount of 7% by weight of separating agent (comparative example 12).

The composition of these several blue inks are indicated in tables 1 and 2 below

TABLE 1 composition of the inks in % by weight

| | Ex 1 | Comp. Ex 1 | Comp. Ex 2 | Comp. Ex 3 | Comp. Ex 4 | Comp. Ex 5 | Comp. Ex 6 |
|---|---|---|---|---|---|---|---|
| ETHANOL | 73.30 | 73.30 | 73.30 | 73.30 | 77.30 | 78.30 | 78.30 |
| PROPANOL-1 | 14.00 | 14.00 | 14.00 | 14.00 | 14.00 | 14.00 | 14.00 |
| PIGMENT BLUE 15:6 | 3.20 | 3.20 | 3.20 | 3.20 | 3.20 | 3.20 | 3.20 |
| PIGMENT VIOLET 37 | 0.85 | 0.85 | 0.85 | 0.85 | 0.85 | 0.85 | 0.85 |
| POLYVINYL BUTYRAL | 0.45 | 0.45 | 0.45 | 0.45 | 0.45 | 0.45 | 0.45 |
| PENTAERYTHRITYL TETRAETHYL HEXANOATE | 3.00 | 7.00 | | | 3.00 | | |
| CETEARYL ETHYL HEXANOATE | 2.00 | | | 7.00 | | | 2.00 |
| DIETHYLHEXYL ADIPATE | 2.00 | | 7.00 | | | 2.00 | |
| SORBITAN STEARATE | 0.40 | 0.40 | 0.40 | 0.40 | 0.40 | 0.40 | 0.40 |
| ADD 3034 | 0.50 | 0.50 | 0.50 | 0.50 | 0.50 | 0.50 | 0.50 |
| ALKYL POLYGLYCOL ETHER PHOSPHATE ACID | 0.30 | 0.30 | 0.30 | 0.30 | 0.30 | 0.30 | 0.30 |
| TOTAL | 100.00 | 100.00 | 100.00 | 100.00 | 100.00 | 100.00 | 100.00 |

TABLE 2 composition of the inks in % by weight

| | Comp. Ex 7 | Comp. Ex 8 | Comp. Ex 9 | Comp. Ex 10 | Comp. Ex 11 | Comp. Ex 12 |
|---|---|---|---|---|---|---|
| ETHANOL | 75.30 | 75.30 | 73.30 | 73.30 | 73.30 | 66.30 |
| PROPANOL-1 | 14.00 | 14.00 | 14.00 | 14.00 | 14.00 | 14.00 |
| PIGMENT BLUE 15:6 | 3.20 | 3.20 | 3.20 | 3.20 | 3.20 | 3.20 |
| PIGMENT VIOLET 37 | 0.85 | 0.85 | 0.85 | 0.85 | 0.85 | 0.85 |
| POLYVINYL BUTYRAL | 0.45 | 0.45 | 0.45 | 0.45 | 0.45 | 0.45 |
| PENTAERYTHRITYL TETRAETHYL HEXANOATE | 3.00 | 3.00 | 3.00 | 3.00 | | 6.00 |
| CETEARYL ETHYL HEXANOATE | | 2.00 | | 4.00 | 2.00 | |
| DIETHYLHEXYL ADIPATE | 2.00 | | 4.00 | | 2.00 | |
| BALMALUB L397 ® | | | | | 3.00 | |
| Pluronic RPE 1740 ® | | | | | | 8.00 |
| SORBITAN STEARATE | 0.40 | 0.40 | 0.40 | 0.40 | 0.40 | 0.40 |
| ADD 3034 | 0.50 | 0.50 | 0.50 | 0.50 | 0.50 | 0.50 |
| ALKYL POLYGLYCOL ETHER PHOSPHATE ACID | 0.30 | 0.30 | 0.30 | 0.30 | 0.30 | 0.30 |
| TOTAL | 100.00 | 100.00 | 100.00 | 100.00 | 100.00 | 100.00 |

The description of the tests carried out in order to compare the erasability at T0 and overtime between the inks is as follow:

Erasability at T0

This test evaluate the erasability of an ink deposit when it is still wet and when it is dry, and its consequences of the erasing on the support.

The test is carried out in a room with controlled air conditioning and humidity: 23° C. (+/−2° C.)/50% Relative Humidity (+/−5%)

The test is carried out on several different writing surfaces: Velleda® type whiteboard (polypropylene film), Melamine whiteboard, lacquered whiteboard and lacquered whiteboard of bad quality.

Before the beginning of the test, the different writing surfaces are cleaned with ethanol and left to dry for 5 minutes. 3 tests are carried out:

erasability of wet marking (before tissue): this test is for checking that the erasing is clean when for example the consumer make an error and wants to erase right away its marking without waiting the film drying time on the writing surface.

The testing procedure consists in making, on each of the writing surface to be tested, a smear having the dimension 20×80 mm and then wiping it off immediately with two fingers in a quick circular movement until total disappearance of the smear.

This step is repeated 5 times in a row as quickly as possible and by making the smear exactly on the same spot (without cleaning the writing surface between the wiping off) and a scoring is assigned depending on what visible mark is left is on the writing surface according to a scoring scale indicated in the below table 3 (from 0 to 10).

TABLE 3

| | scoring depending of the observation | | | | |
|---|---|---|---|---|---|
| | Observation | | | | |
| | No mark | Slight mark | Medium mark | Important mark | Very important mark |
| Scoring | 10 | 7.5 | 5 | 2.5 | 0 |

Erasability of Wet Marking (after Tissue):

if there is still a mark, the writing surface is wiped off with an absorbing paper (3 times maximum) and a scoring is also given depending on what is still visible on the writing surface, with the same scoring scale as mentioned above in table 3 (from 0 to 10).

Erasability of Dry Marking: Usual Use of the Consumer

The testing procedure consists in making, on each of the writing surface to be tested, a smear having the dimension 20×80 mm and then let it dry for 5 minutes. The smear is then wiped off with an absorbent paper with a back and forth motion until total disappearance of the smear.

This step is repeated 3 times in a row by making the smear exactly on the same spot (without cleaning the writing surface between the wiping off) and a scoring is assigned depending on what visible mark is left on the writing surface according to the same scoring scale indicated in above in table 3 (from 0 to 10).

Erasability in Time

This test evaluates how soon the deposit of the dry erasable ink adheres on a particular writing surface and can therefore not be erased anymore.

The test is carried out in a room with controlled air conditioning and humidity: 23° C. (+/−2° C.)/50% Relative Humidity (+/−5%)

The test is carried out on several different writing surfaces: Velleda® type whiteboard (polypropylene film), Melamine whiteboard, whiteboard covered by a PVC film, lacquered whiteboard and lacquered whiteboard of bad quality. Before the beginning of the test, the different writing surfaces are cleaned with ethanol and left to dry for 5 minutes.

The testing procedure consists in making vertically, on each of the writing surface to be tested, as many smear (having the dimension 10×10 mm) as desired ageing interval. After each ageing interval and for each writing surface, the smear is wiped off with a clean absorbent paper with a quick back and forth fluid motion without pressing very hard.

The test is stopped once the ink adheres to the writing surface or as soon as the ink cannot be erased at all.

The result in the erasing, expressed in time, corresponds to the ageing interval which preceded the adhesion of the ink or the non-erasure of the ink.

The results obtained with the different inks are indicated in the following tables 4 and 5.

Table 4 and 5: results of the erasing tests

| Tests | | Surface | Ex 1 | Comp Ex 1 | Comp Ex 2 | Comp Ex 3 | Comp Ex 4 | Comp Ex 5 | Comp Ex 6 |
|---|---|---|---|---|---|---|---|---|---|
| erasability at T0 (scoring) | Wet marking before tissue | Velleda® | 7.5 | 5 | 7.5 | 7.5 | 5 | 5 | 5 |
| | | Melamine | 7.5 | 5 | 7.5 | 7.5 | 5 | 7.5 | 7.5 |
| | | Lacquered board | 10 | 5 | 7.5 | 7.5 | 5 | 7.5 | 7.5 |
| | | Lacquered board (bad quality) | 7.5 | 5 | 7.5 | 7.5 | 2.5 | 7.5 | 7.5 |
| | Wet marking after tissue | Velleda® | 10 | 10 | 10 | 10 | 7.5 | 7.5 | 7.5 |
| | | Melamine | 10 | 10 | 10 | 10 | 7.5 | 10 | 10 |
| | | Lacquered board | 10 | 10 | 10 | 10 | 10 | 10 | 10 |
| | | Lacquered board (bad quality) | 10 | 10 | 10 | 10 | 7.5 | 10 | 10 |
| | Dry marking | Velleda® | 10 | 10 | 10 | 10 | 10 | 10 | 10 |
| | | Melamine | 7.5 | 5 | 7.5 | 5 | 7.5 | 5 | 7.5 |
| | | Lacquered board | 10 | 10 | 10 | 10 | 10 | 10 | 10 |
| | | Lacquered board (bad quality) | 10 | 10 | 10 | 10 | 10 | 10 | 10 |
| erasability in time (time) | | Velleda® | 3 weeks to 1 month | T3 OK | 1 to 3 days | <1 day | <1 day | <1 day | <1 day |
| | | PVC Film | 2 to 3 months | 2 to 3 months | 1 to 2 weeks | 2 to 3 months | 1 to 2 months | 1 to 2 weeks | 1 to 2 months |
| | | Melamine | 2 to 3 weeks | 1to 2 weeks | 3 days to 1 week | 3 days to 1 week r | 1 to 3 days | 1 to 3 days | 1 to 3 days |
| | | Lacquered board | >3 months | >3 months | >3 months | 1 to 2 weeks | 1 to 2 weeks | 1 to 2 weeks | 3 days to 1 week |
| | | Lacquered board (bad quality) | 2 to 3 weeks | 1 to 2 weeks | 3 weeks to 1 month | 1 to 2 weeks | 3 days to 1 week | 3 days to 1 week | 3 days to 1 week |

| Tests | Surface | Comp Ex 7 | Comp Ex 8 | Comp Ex 9 | Comp Ex 10 | Comp Ex 11 | Comp Ex 12 |
|---|---|---|---|---|---|---|---|
| erasability at T0 (scoring) | Wet marking before tissue | | | | | | |
| | Velleda ® | 5 | 5 | 7.5 | 7.5 | 10 | 0 |
| | Melamine | 7.5 | 5 | 5 | 5 | 7.5 | 0 |
| | Lacquered board | 5 | 7.5 | 7.5 | 7.5 | 10 | 0 |
| | Lacquered board (bad quality) | 7.5 | 7.5 | 7.5 | 7.5 | 10 | 0 |
| | Wet marking after tissue | | | | | | |
| | Velleda ® | 10 | 7.5 | 10 | 10 | 10 | 0 |
| | Melamine | 10 | 7.5 | 7.5 | 10 | 10 | 0 |
| | Lacquered board | 10 | 10 | 10 | 10 | 10 | 0 |
| | Lacquered board (bad quality) | 10 | 10 | 10 | 10 | 10 | 0 |
| | Dry marking | | | | | | |
| | Velleda ® | 10 | 10 | 10 | 10 | 10 | 0 |
| | Melamine | 7.5 | 5 | 7.5 | 5 | 7.5 | 0 |
| | Lacquered board | 10 | 10 | 10 | 10 | 10 | 0 |
| | Lacquered board (bad quality) | 10 | 10 | 10 | 10 | 10 | 0 |
| erasability in time (time) | Velleda ® | 2 to 3 weeks | 2 to 3 weeks | 2 to 3 weeks | 1 to 2 weeks | 3 days to 1 week | <15 mins |
| | PVC Film | 2 to 3 months | 2 to 3 months | 2 to 3 months | 2 to 3 months | 2 to 3 months | <15 mins |
| | Melamine | 1 to 2 weeks | 1 to 2 weeks | 1 to 2 weeks | 1 to 2 weeks | 1 to 2 weeks | <15 mins |
| | Lacquered board | >3 months | 3 days to 1 week | >3 months | 1 to 2 weeks | >3 months | <15 mins |
| | Lacquered board (bad quality) | 3 days to 1 week | 3 days to 1 week | 1 to 2 weeks | 3 days to 1 week | 1 to 2 weeks | <15 mins |

The ink composition according to the present disclosure (ex 1) has therefore the best results for the erasability properties at T0 and over time.

Comparative examples 2 and 11 are comparable with the ink composition according to the present disclosure in term of erasability at T0 but are less effective on the erasability test over time.

Comparative example 1 is comparable with the ink composition according to the present disclosure on the erasability test over time but is less effective on the erasability test on wet marking (before tissue) at T0.

The ink composition according to the present disclosure (ex 1) is therefore the best compromise for the erasability properties whatever the writing surface and whatever the time of erasure.

The combined use of pentaerythrityl tetraethylhexanoate, cetearyl ethylhexanoate and diethylhexyl adipate as separating agent is therefore synergistic on the erasability property of an alcohol-based dry erasable ink, whatever the writing surface.

The invention claimed is:

1. Alcohol-based dry erasable ink for writing instrument comprising as separating agent, advantageously as the only separating agent, a mixture of a pentaerythritol tetraester (a1), a fatty acid monoester (a2) and a fatty acid diester (a3).

2. Alcohol-based dry erasable ink according to claim 1, wherein the pentaerythritol tetraester (a1) is an ester having the following formula (I)

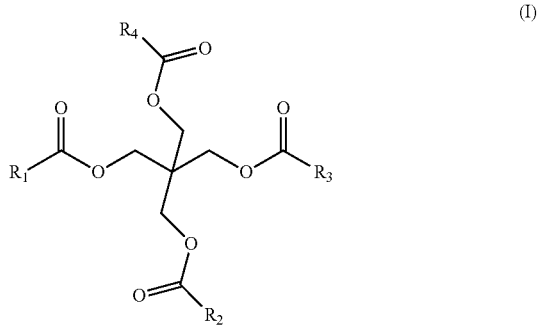

in which $R_1$, $R_2$, $R_3$ and $R_4$ represent independently of each other a $C_4$-$C_{20}$ alkyl group, advantageously it is the pentaerythrityl tetraethylhexanoate.

3. Alcohol-based dry erasable ink according to claim 1, wherein the fatty acid monoester (a2) has the following formula (II):

$$R_5COOR_6 \qquad (II)$$

in which $R_5$ represents a $C_1$-$C_{20}$ alkyl group and $R_6$ represents a $C_8$-$C_{22}$ alkyl group, advantageously it is the cetearyl ethylhexanoate.

4. Alcohol-based dry erasable ink according to claim 1, wherein the fatty acid diester (a3) has the following formula (III):

$$R_7OCO(CH_2)_nCOOR_8 \qquad (III)$$

in which $R_7$ and $R_8$ represent independently of each other a $C_1$-$C_{20}$ alkyl group and n is an integer in the range 2-10, advantageously it is the diethylhexyl adipate.

5. Alcohol-based dry erasable ink according to claim 1, wherein the pentaerythritol tetraester (a1) content is in the range 0.1-25% by weight, advantageously in the range 1-5% by weight, based on the total weight of the ink.

6. Alcohol-based dry erasable ink according to claim 1, wherein the fatty acid monoester (a2) content is in the range 0.1-10% by weight, preferably in the range 0.5-10% by weight, advantageously in the range 0.5-4% by weight, based on the total weight of the ink.

7. Alcohol-based dry erasable ink according to claim 1, wherein the fatty acid diester (a3) content is in the range 0.1-10% by weight, advantageously in the range 0.5-4% by weight, based on the total weight of the ink.

8. Alcohol-based dry erasable ink according to claim 1, wherein the alcohol is an alcohol having the following formula (IV):

$$R_9-OH \qquad (IV)$$

in which $R_9$ represents a $C_1$-$C_6$ alkyl group, advantageously the alcohol is selected in the group consisting of ethanol, propanol and mixture thereof.

9. Alcohol-based dry erasable ink according to claim 1, wherein the alcohol content is in the range 40-95% by weight, advantageously in the range 75-90% by weight, based on the total weight of the ink.

10. Alcohol-based dry erasable ink according to claim 1, wherein it further comprises a pigment, a resin and optionally additives.

11. Alcohol-based dry erasable ink according to claim 10, wherein the additive is selected in the group consisting of surfactant, denaturing agent, cap-off additive, manufacturing additives and mixture thereof.

12. Alcohol-based dry erasable ink according to claim 10, wherein the pigment content is in the range 0.1-10% by weight, advantageously in the range 1-5% by weight, based on the total weight of the ink.

13. Alcohol-based dry erasable ink according to claim 10, wherein the resin content is in the range 0.1-10% by weight, advantageously in the range 0.2-2% by weight, based on the total weight of the ink.

14. Alcohol-based dry erasable ink according to claim 1, wherein it is intended to be used in a marker pen, advantageously having a fibrous tip.

15. Alcohol-based dry erasable ink according to claim 1, wherein it is intended to be used on a non-porous surface, in particular a smooth surface, such as a whiteboard.

16. Writing instrument, comprising an alcohol-based dry erasable ink according to claim 1, advantageously the writing instrument is a marker pen, more advantageously with a fibrous tip.

17. Alcohol-based dry erasable ink according to claim 1, wherein the fatty acid monoester (a2) is not sorbitan stearate.

18. Alcohol-based dry erasable ink according to claim 1, wherein the pentaerythritol tetraester (a1) is pentaerythrityl tetraethylhexanoate.

19. Alcohol-based dry erasable ink according to claim 1, wherein the fatty acid monoester (a2) is the cetearyl ethylhexanoate.

20. Alcohol-based dry erasable ink according to claim 1, wherein the fatty acid diester (a3) is diethylhexyl adipate.

* * * * *